Figure 1:
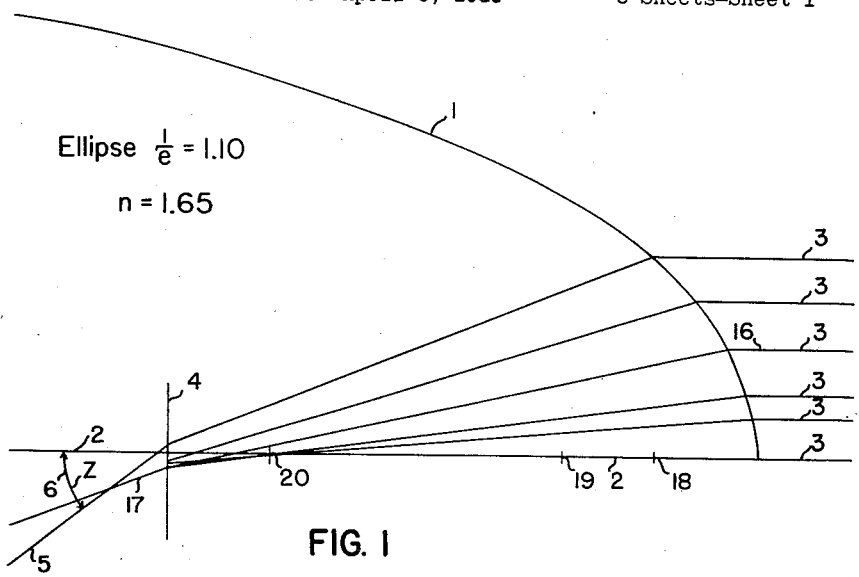

Aug. 4, 1942.    H. S. NEWCOMER    2,292,152
UNIFORM FLUX SPECULAR SCREEN
Filed April 5, 1939    6 Sheets-Sheet 5

FIG. 6

Ellipse $\frac{1}{e} = 1.12$
$n = 1.50$

FIG. 7

FIG. 8

INVENTOR
Harry Sidney Newcomer

INVENTOR
Harry Sidney Newcomer

Patented Aug. 4, 1942

2,292,152

UNITED STATES PATENT OFFICE 2,292,152

UNIFORM FLUX SPECULAR SCREEN

Harry Sidney Newcomer, New York, N. Y.

Application April 5, 1939, Serial No. 266,101

21 Claims. (Cl. 88—24)

This invention relates to improvements in multiple refracting element back-projection or specular screens. In particular it relates to means for providing uniform light flux throughout a large solid angle on the viewing side of such screens or specular light diffusing devices, and for the delimitation of such visibility angles to any predetermined amount. It also provides that out of the total area allocated to each refracting element as a light receiving device, only a relatively small proportion on the exit or viewing side is utilized or required for passing the entire light flux received on the other side. This makes possible that the viewing side, when light is not being transmitted, appears as a dark or black screen, even when other light is made incident thereon.

In addition to light incident on the front surface being reflected back to only a minor degree, light quite obliquely incident on the back surface is not transmitted within the viewing angle.

It is well known that an ellipse with numerical eccentricity $e$ composed of a light refracting medium of index $$\frac{1}{e}$$

brings all the rays incident upon it parallel to its longer axis to a focus in a point positioned at the focal point of the ellipse which is situated to the opposite side from the incident light, that is at its opposite focus. Jensen in his U. S. Patent No. 1,824,353 has made use of this principle to devise a screen comprising a multiplicity of elements of index $$\frac{1}{e}$$

each an ellipsoid of revolution of eccentricity $e$ made by rotating such an ellipse about its major axis, and each of size small enough to conform, in relative dimensions to the film image, to the grain size of such image, in which the ellipsoidal elements are cut off at the further focal point by a plane surface perpendicular to the major axis of the ellipsoid and serving therefore to constitute an exit surface for the light incident, parallel to the axis on the opposite ellipsoidal surface.

Since, with Jensen's device, all the light incident on the ellipsoid parallel to its major axis passes through the axial point of the said plane surface made perpendicular to the axis at this point, the whole of each such elemental plane surface, except for the central point, can be blackened without interfering with the exit of the light. There thus results a substantially black screen transmitting all the light incident perpendicular on the opposite side thereof. With Jensen's device the light refracting elements each bring the light to a focus at a screen aperture. This focus is at the same time positioned at that geometrical focus of the ellipsoid situated furthest from the exposed surface of the same. Jensen's device does not provide for the contingency of oblique incidence on the screen.

An object of the present invention is to overcome one of the principal disadvantages of the Jensen screen, namely the fact that the luminosity of a screen so constructed, when looked at from the plane surface or black side, is far from uniform throughout the usual solid viewing angle. Another object is to provide means for extending and/or delimiting by a predetermined amount the solid viewing angle within which light is spread by such screens, including provision for the same where light is not normally incident on the screen.

The Jensen screen element is formed by an ellipse of reciprocal numerical eccentricity $$\frac{1}{e}$$

equal to the index of refraction of the material of which it is composed. With the usual transparent materials the range of indices available is thus from about 1.45 to something over 1.70. Using such reciprocal eccentricities the light flux on the viewing side at angles with the axis of about 30° is about 30%, or more, less than along the axis. Also for any given eccentricity, even within the above ranges, there is insufficient change in the light flux intensity distribution with change in the index of the material used to make possible a reasonably uniform light distribution. The change in index from equality with the reciprocal eccentricity disturbs the focus of the rays at the focus of the ellipse, but does not sufficiently affect the rate of change, with respect to the height of the incident ray, of the emergence angles made with the axis by the exit rays, to make such change a suitable means of correcting this defect in the Jensen device. In other words it does not sufficiently improve the luminosity gradient for angle change to make it even approximately zero.

For an index and reciprocal eccentricity of 1.65 the luminosity calculated without reference to reflection losses, at a 30° angle with the perpendicular to the screen, even when assuring normal incidence on the other side of the screen, is only about 73%. As will be shown later, the situation is even worse for smaller indices and very much worse for larger angles.

I have discovered that it is possible to retain all of the advantages of the Jensen screen and entirely overcome the above mentioned disadvantages, even while using an ellipsoidal figure, by a means which entirely abandons the Jensen principle of bringing the rays to a focus at the opposite focal point of an ellipsoid of revolution, or even to a focus elsewhere.

Figure 2:
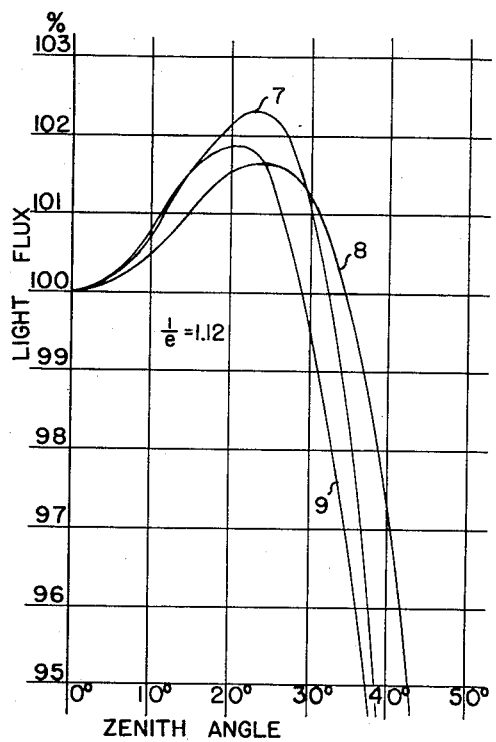
Figure 3:
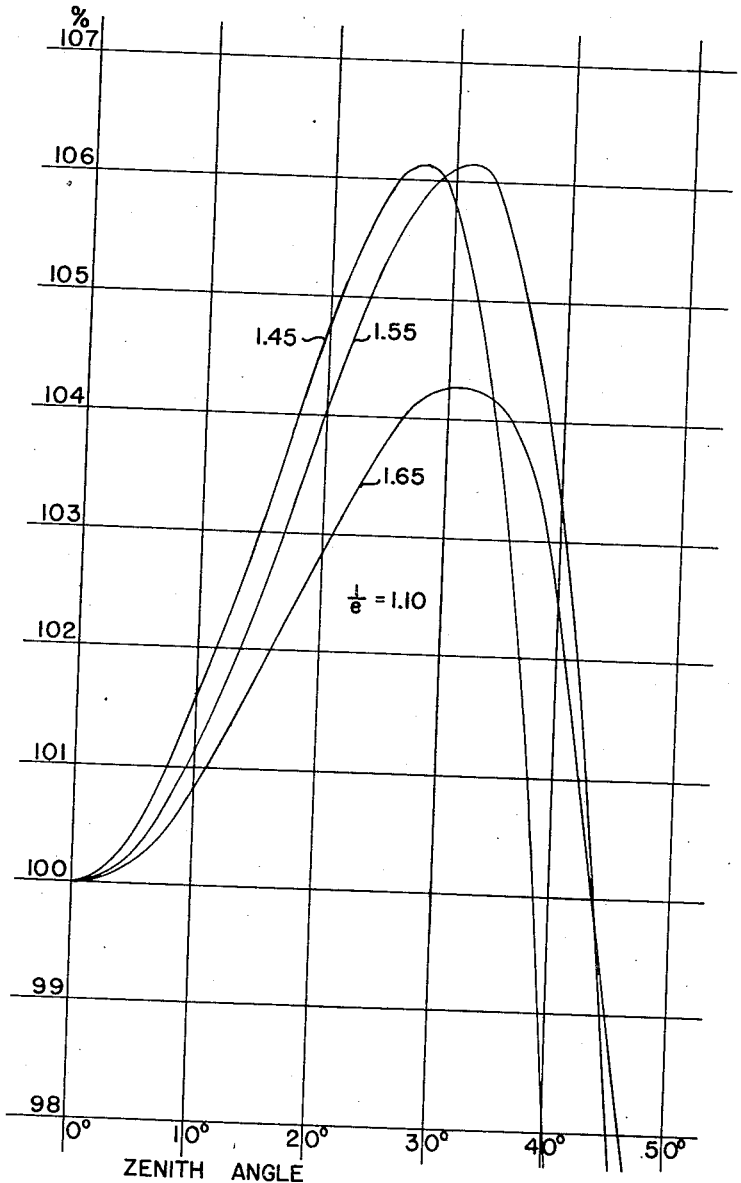
Figure 4:
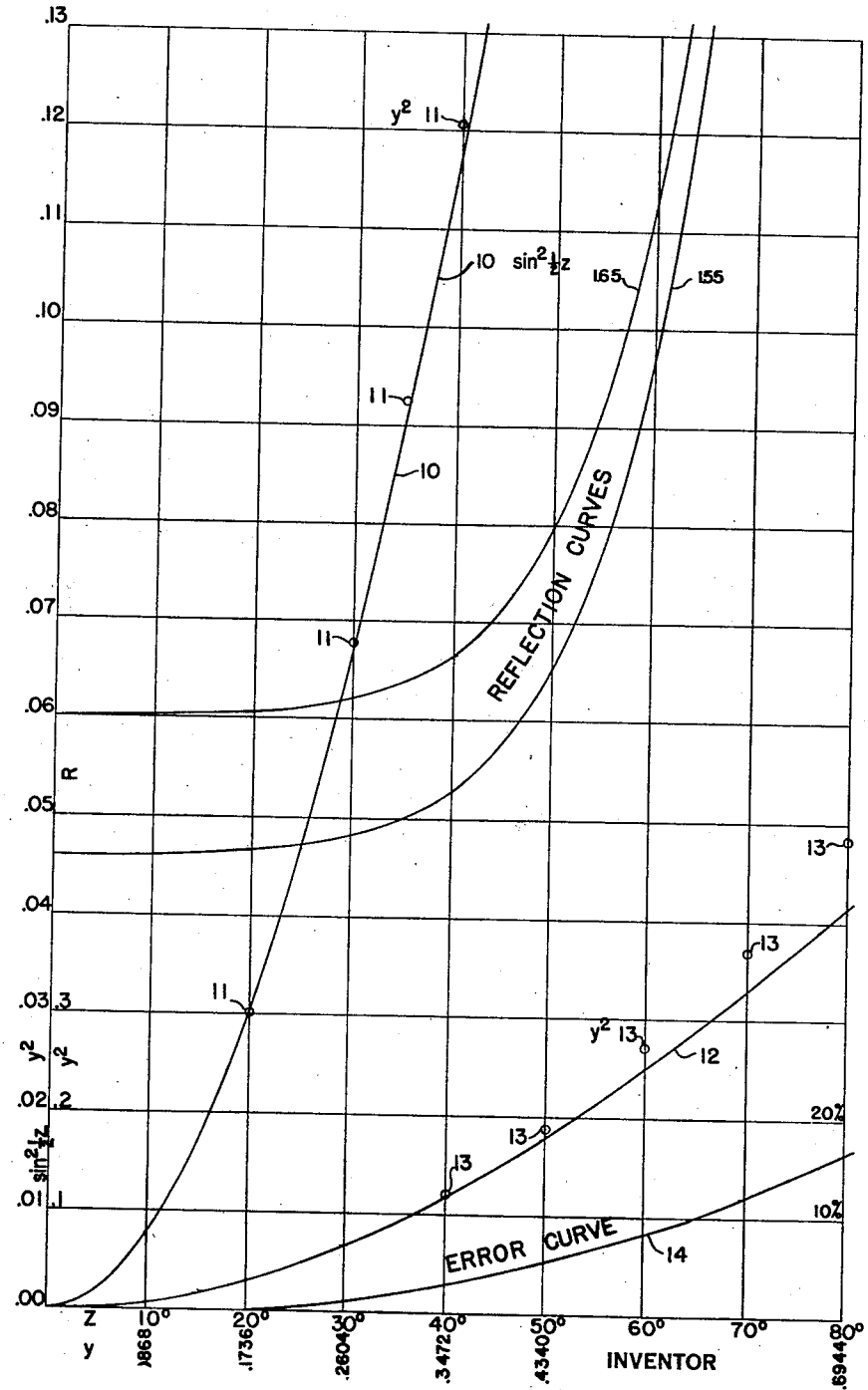
Figure 5:
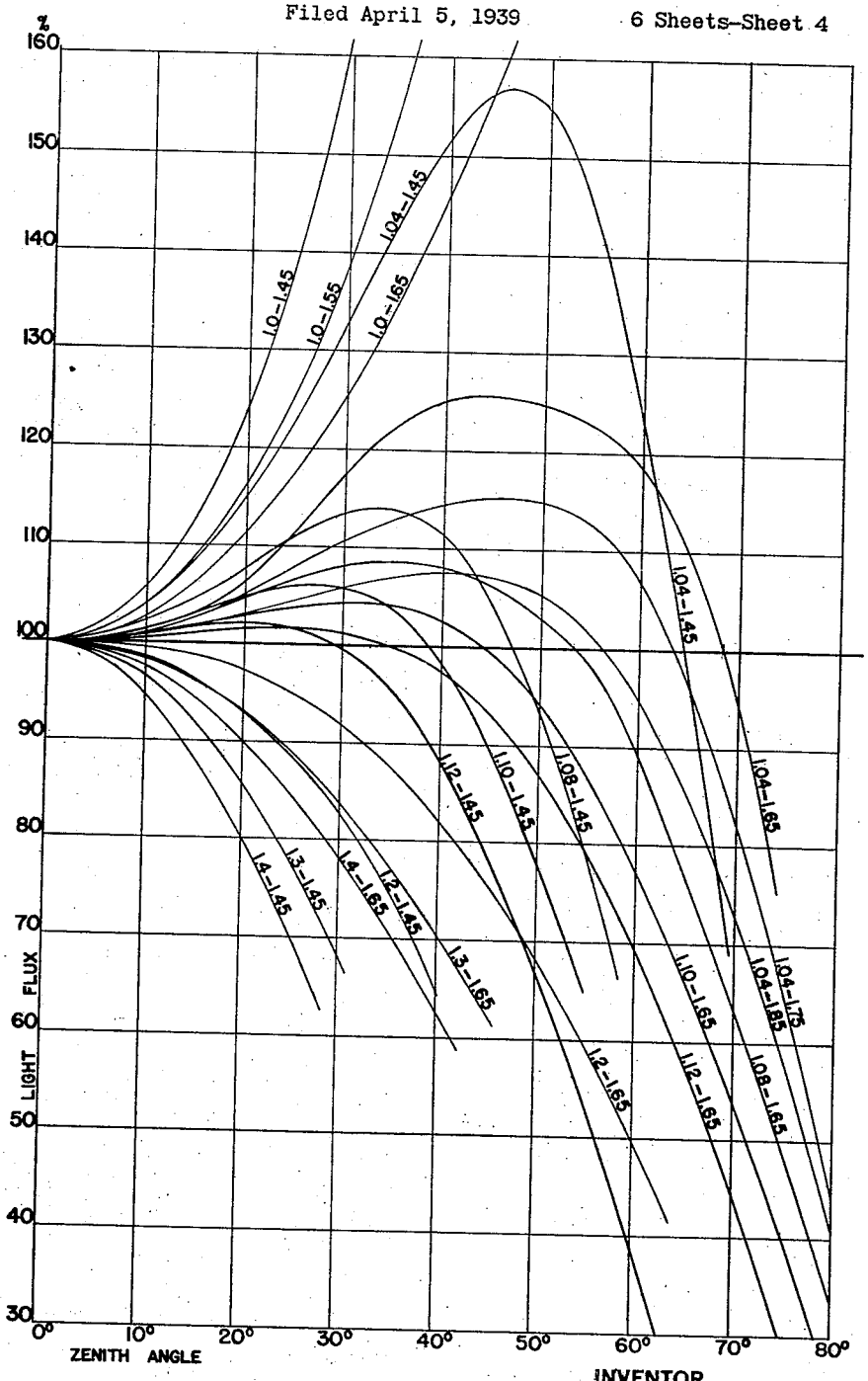
Figure 9:
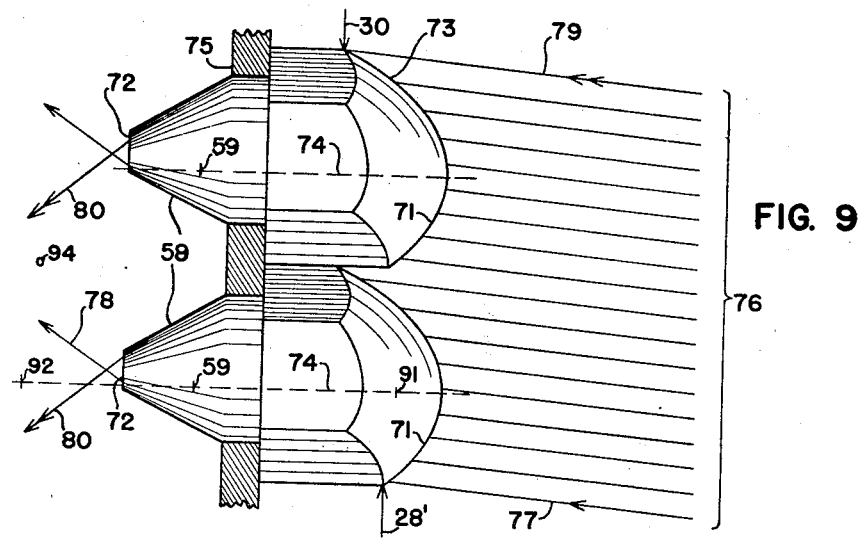
Figure 10:
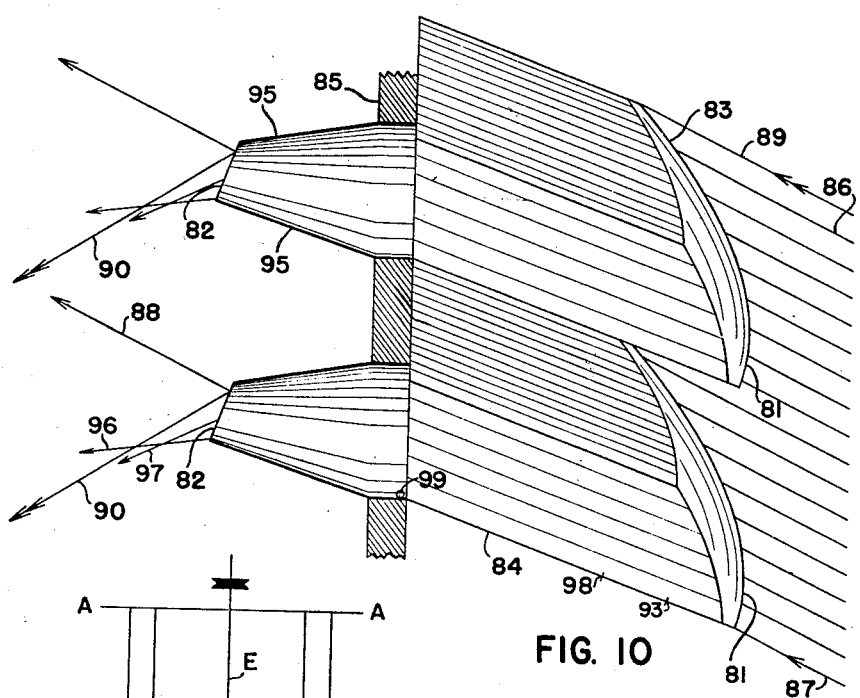
Figure 11:
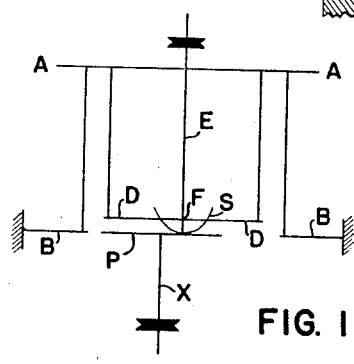

I have discovered that a solution of the general problem as above set forth can be obtained by means the nature of which will be better understood by a development of certain mathematical relationships, and by reference to the accompanying drawings, in which Fig. 1 is a longitudinal section through an ellipsoid of revolution of reciprocal eccentricity substantially different from the index and showing certain relationships applicable to a screen element according to the invention, and Fig. 2 is a large scale plot of flux values for different view angles for light incident parallel to the axis on a group of ellipsoids having an eccentricity according to the invention, the plots corresponding to values for ellipsoids of three different indices, and Fig. 3 is another similar large scale plot for a slightly different eccentricity, but within the invention, and Fig. 4 is a correction or error curve for converting equiangular zones into equal area zones together with a large scale plot of certain reflexion losses, and Fig. 5 is a graph of flux values for a series of ellipsoids of reciprocal eccentricity 1.04 to 1.4, having each indices respectively of 1.45 and 1.65; and some others, and also including curves for the paraboloid, and Fig. 6 is an ellipse corresponding to a longitudinal section through an ellipsoidal screen element according to the invention, showing certain light path relationships, and Fig. 7 shows in perspective two such screen elements or lenticules assembled as part of a screen, and Fig. 8 is a plan view of another lenticule screen pattern embodying features of the invention, and Fig. 9 shows in perspective another screen lenticule arrangement correcting for oblique incidence, and Fig. 10 shows in perspective still another screen lenticule arrangement correcting for oblique incidence, and Fig. 11 is a diagram of an ellipsoidal surface generating machine.

In Fig. 1, I represents in longitudinal section an ellipsoid of revolution of index 1.65 made by rotation of an ellipse of eccentricity $$\frac{1}{e} = 1.10$$

about its major axis 2. Light rays 3 are incident on the ellipsoid parallel to the major axis as if they came from a distant projector. They may be considered for purposes of analysis as constituting a beam of uniform intensity. The beam is refracted at the surface of the ellipsoid by the refracting material of which it is composed and each ray thereof is then again refracted to an angle 6 with the axis 2 as it exits from the ellipsoid at the plane surface 4, a surface perpendicular to the major axis 2. To avoid confusion the continuation after the second refraction of only the axial ray 2 and the marginal ray 5 and an intermediate ray are shown. 5, as drawn makes a viewing angle 6 or zenith angle z of 38°.28 with the axis. An intermediate ray 16 of the beam 3 is shown at the second refraction as the ray 17. These exit rays 2, 5, 17 and others do not focus at the plane 4, but fall upon it over an area nevertheless much smaller than the entrance pupil on the ellipse.

At 18 I show the position of the proximal geometrical focus of the ellipse 1. 19 is the location of the center of curvature of the vertex of the ellipse and 20 is the location of the focal point in the medium of index $n$ of paraxial rays 3. The least cross section of the exit beam is chosen as the location of the plane 4. It is substantially further from the vertex than is the focal point 20.

Such an arrangement, involving a certain choice of eccentricity or reciprocal eccentricity within a range to be designated and discussed has as I have discovered many advantages. In Fig. 1, all of the rays pass through a very small area on the plane 4, about 1/270 of the frontal section of the incident beam 3. Moreover, as will be shown, in this example the light flux distribution along the exit rays of which the ray 5 is one, is nearly constant up to angles as great as the angle 46°.38 of Table 1, column 5. As will be seen from the table, and from Fig. 3, curve 1.65, the deviation from 100% flux at the center for this Fig. 1, is not more than 4½% up to the depicted angles. Adding rays up to an exit angle of 46°.38 as given in table, increases the size of the necessary exit area on the plane 4, but by shifting the plane 4 slightly further to the left this area still need be only about 1/130 of the area of the frontal section of the incident beam.

If $y$ designate the distance of any ray 3 from the axis 2, then equal increments of $y$ represent increments of light flux on the ellipsoid which are measured by corresponding circular zonal areas in the frontal plane of the beam and are proportional to the rate of change in area of a circle of radius $y$ with increments in its radius. Such increments of $y$ may be thought of as correlated to increments in an exit angle 6 made by the ray as it leaves the plane surface 4. For viewing angles up to about 30° with the normal, the increments in surface area of that portion of a sphere, with center in the axial point of the exit surface 4, which is intercepted by a cone which embraces the said viewing angle or solid angle distribution of light flux transmitted by the screen element, are increments substantially proportional, as measured by equal increments of viewing angle, to increments in circle area measured by equal increments in radius $y$. Within such limits there will thus be uniform distribution of light flux within the said solid exit angle, an angle which might be shown in section as lying between two marginal exit light rays to either side of the axis, of which the ray 5 is for instance one lying to one side, provided equal increments of $y$ correspond to equal increments of the angle 6. The latter angle might be called the refraction angle $r'$ or zenith angle $z$. The exact relationship for such equality at any angle $r'$ or $z$ will be discussed later and taken into consideration.

As has been stated, the solution of Jensen by which $e$, which in the ellipse is less than 1, is equal to $1/n$, the reciprocal of the index of refraction, does not give a uniform distribution of the light flux in the solid exit angle. It does however bring all the rays to focus at a point. The point is at the opposite geometrical focus of the ellipse.

I have discovered that such a uniform distribution up to about 30° semiangle, and in some circumstances substantially uniform flux even up to 50° or more, is obtained by choosing $1/e$ to have a value appreciably less than $n$. There is a range of values for $1/e$ extending, as will be shown, from about 1.06, or possibly 1.04, to not quite 1.2 for which the distribution is much more uniform than it is outside this range. The best values up to certain zenith angles are in the vicinity of $1/e$ equal to approximately 1.12. A value of $1/e=1.1$ gives a somewhat increased light flux density (as compared with the center) at intermediate but large angles with the axis, and extends the upper limits of the angle at which such excess is had, as well as the upper limits of view angle for which substantial equality is had. There is about 3 to 4% excess flux, as compared with the first mentioned ellipse, in the interval from 20° to 30° (semi) angle when the index is small, namely 1.45; and 1 or 2% more excess flux at these angles with the larger indices, 1.55 and 1.65. At index 1.45 the maximum angle for equivalence of flux is decreased as compared with larger indices.

The following table gives, in the first four columns, the exit angles and light flux measurements, as compared with 100% for the center, for a truncated ellipsoid of reciprocal eccentricity 1.12 and index 1.5 as well as for index 1.65. In the last two columns are given values for a reciprocal eccentricity of 1.1 and index 1.65.

Table I

| $e=\frac{1}{1.12}$ | | $e=\frac{1}{1.12}$ | | $e=\frac{1}{1.1}$ | |
|---|---|---|---|---|---|
| Index 1.5 | | Index 1.65 | | Index 1.65 | |
| Exit angle z | Light flux | Exit angle z | Light flux | | |
| | Percent | | Percent | | |
| 0° | 100 | 0° | 100 | 0° | 100 |
| 5°.54 | 100.2 | 7°.20 | 100.22 | 7°.778 | 100.5 |
| 8°.83 | 100.6 | 11°.48 | 100.61 | 12°.39 | 101.28 |
| 15°.30 | 101.6 | 19°.89 | 101.47 | 21°.383 | 103.1 |
| 21°.54 | 102.27 | 28°.04 | 101.5 | 30°.0 | 104.3 |
| 27°.54 | 101.9 | 35°.95 | 99.43 | 38°.28 | 103.3 |
| 30°.45 | 101.0 | 39°.84 | 97.42 | 42°.34 | 101.2 |
| 33°.31 | 99.5 | 43°.73 | 94.28 | 46°.38 | 98.1 |
| 42°.60 | 89.67 | 57°.144 | 75.1 | 53°.2 | 89.7 |

The values in the first four columns of Table I are plotted in Fig. 2 at 7 for index 1.5 and at 8 for index 1.65. In this figure the abscissae are exit angles $z$ and the ordinates are percent light flux with respect to the center taken as 100%. At 9 I show a plot of values for index 1.45.

By way of comparison, in Fig. 3 I plot to the same scale values for indices 1.45, 1.55 and 1.65, represented by the curves of like number, for a truncated ellipsoid of reciprocal numeral eccentricity 1.10. The flux is increased in the intermediate angles by 3 or 4% and the useful angle extended by about 10° as compared with the values of Fig. 2 drawn for a reciprocal numerical eccentricity 1.12.

A better understanding of the influence of eccentricity and index of the ellipsoid on light flux distribution under the conditions shown in Fig. 1 will be had by reference to the plots of Fig. 5. But first the method of arriving at the light flux at any viewing angle after refraction by such a truncated ellipsoid will be explained.

I will use the parametric equations for an ellipse having semiaxes $a$ and $b$, namely $$x = a \cos t$$
$$y = b \sin t$$

where $t$ is a parameter expressing polar angle. Light is considered as incident parallel to the axis of an ellipsoid formed by revolution of this ellipse about its longer axis $a$. The geometrical foci of the ellipse are on the major axis distant $a-\sqrt{a^2-b^2}$ from each vertex. The radius of curvature of this vertex is $b^2/a$ and the optical focus in the medium of index $n$ is distant $$\frac{n}{n-1} \times \frac{b^2}{a}$$

from the vertex. When the numerical eccentricity equals $1/n$ this optical focal distance becomes $a+\sqrt{a^2-b^2}$ or $2a-(a-\sqrt{a^2-b^2})$. The normally incident light may be supposed to have uniform frontal flux density over an area normal to said axis and the total amount of light falling on any ellipsoidal element is hence measured by the area of a circle with center on the axis and radius $y$, where $y$ is the maximum height of the ellipse utilized. Any value of $y$ measures the corresponding incident light flux area and to such $y$, or height of incident light ray, there corresponds a certain exit angle $r'$ from the truncated ellipsoid. A change in $y$ provokes a change in the exit angle $r'$. It is necessary to establish a relationship between flux density distribution before and after refraction by the truncated ellipsoidal element. It is necessary, for the moment, to obtain a relationship for rate of change of flux density with change in $r'$.

Since the absolute size of the element of frontal radius $y$ is immaterial in this discussion, it is convenient to set the constant $a$ in the above equations equal to unity. The constant $b$ is then calculated from the known numerical eccentricity $e$ where $$e = \frac{\sqrt{a^2-b^2}}{a}$$

The problem is to relate equal increments in $y$ to increments in refraction angle at the exit surface. The refraction angle for a given value of $y$ is compared with an angle corresponding to $y+\delta y$. For convenience $\delta y$ may be taken as $.001 \times b$. This makes the corresponding increment in $\sin t$ equal to .001.

To find the corresponding refraction angles use is made of the equation $$\sin i = \frac{-a \sin t}{\sqrt{a^2 \sin^2 t + b^2 \cos^2 t}}$$

where $i$ is the incidence angle or angle between the axis and the normal to the ellipse at a point given by the parameter $t$. Values are calculated for $y$ and $y+\delta y$ at various points $t$. Having found $\sin i$, the ray can be followed through trigonometrically to refraction at the exit surface. The difference in the exit angles for $y$ and $y+\delta y$ is compared with the value of $\delta z$ at the center, that is corresponding to $\delta y$. The ratio gives the ratio of the flux at the marginal angle (corresponding to $y$) to that at the center (along the axis normal to the screen).

The assumption that equal increments in $y$ corresponding to equal increments in refraction or exit angle means constant light flux on refraction is based on the assumption that solid angular areas, or spherical areas, on the refraction side are proportional to plane circular areas on the incidence side. This is true, within 1%, up to semiangles of 30°. The true situation is as follows.

It is well known that on the surface of a sphere the area included between two parallels of latitude is equal to the area intercepted between the two latitude planes on a cylinder tangent to the sphere at the equator. In other words, for any radius, the area between the zenith and a latitude given by a zenith angle $z$ (or $r'$) is proportional to $1 - \cos z$, that is to $\sin^2 \frac{1}{2}z$. In the case of the plane circle representing the frontal section of the incident beam, the area is proportional to the square of $y$ (the radius). Hence the two areas are proportional as long as both $y$ and the sin are linear, which they are for small enough angles. The relationship for all angles 0° to 80° is shown in Fig. 4. Since it is not necessary to consider correspondence as to absolute value of area we can choose a coordinate scale for $y$ such that the two areas are numerically equal at some predetermined angle $z$. I have arbitrarily chosen 20° for this angle, since this is a mean point in the range of useful angles and such a choice makes the square value curves for $z$ less than 20°, for all practical purposes coincident.

In Fig. 4 I plot at 10 the values of $\sin^2 \frac{1}{2}z$ for values of $z$ from 0 to 40°, the abscissae being values of $z$. The points 11 are corresponding values for $y^2$ where the abscissae are the values of $y$ from 0 to 0.3472, the respective abscissae scales being chosen such that at 20° the value of $y$ is 0.1736 or $\sqrt{.03}$. At 12 and 13 I plot respectively the values of $\sin^2 \frac{1}{2}z$ and $y^2$ to a reduced or one tenth scale so as to extend the values up to 80° and 0.6944 respectively for $z$ and $y$. The divergence in these values of the squares indicates the error in taking increments of $z$ as a measure of light flux corresponding to increments in $y$. The ratio of these two sets of values is plotted as an error curve 14. It rises from zero error at 20° (and substantially zero below 20°) to 1% at 30°, 3% at 40°, 5% at 50°, 8% at 60°, 12% at 70°, 16½% at 80° and 22% at 90°. The sense of this error is to increase the light flux calculated in terms of increments of $z$.

The losses due to reflection at the two surfaces are not uniform with respect to $y$. For incidence at angle $i$ on a polished surface, where $r$ is the angle of refraction, the theoretical loss by reflection is $$R = \frac{1}{2}\left[\frac{\sin^2 (i-r)}{\sin^2 (i+r)} + \frac{\tan^2 (i-r)}{\tan^2 (i+r)}\right]$$

where $$R = \left[\frac{n_2 - n_1}{n_2 + n_1}\right]^2 \text{ for } i = 0$$

and $$R = 1 \text{ for } i = 90°$$

and where $n_1$ and $n_2$ are the indices of the first and second mediums. For glass of index 1.55 and 1.65 in air these values are

| | $i=0°$ | 20° | 40° | 50° | 60° | 70° | 75° |
|---|---|---|---|---|---|---|---|
| $n=1.55$ | $R=.046$ | .0465 | .0526 | .065 | .0973 | .180 | .262 |
| $n=1.65$ | $R=.060$ | .0605 | .0666 | .0797 | .1129 | .1956 | .2764 |

These values of R, reflection loss at a highly polished surface separating air and a transparent reflecting material of index 1.55 and 1.65 are plotted in Fig. 4 at 1.55 and 1.65 respectively. The abscissae are incidence angles, 0° to 70°, and the ordinates values of R. The ordinate scale is ten times that used for the curve 14. In the above formula $i$ is the incidence angle. Where the ray is exiting from the optical material the same formula can be applied, and for the table, $r$ is substituted for $i$.

In the present problem loss of the above kind takes place at two surfaces and in general for different values of $i$ and $r$ at each surface. However as $z$, or $r'$ increases so does $i$. For small angles and $n=1.55$ there is a constant total loss of about 9% which should be taken as a basal loss in arriving at the relative increase in light loss with greater angles. Similarly for other indices.

For the ellipse $$\frac{1}{e} = 1.1$$

and $n=1.55$ at $r'=39°$ the exit loss is about .052 and the entrance loss at $i=56°$ is about .081 i. e. the total about .129 or transmission .871 as compared with .91 at the center. The relative loss is then 4.5% above the center. For $r'=49°$ the corresponding $i$ is 65° and the total excess loss about 11.8%.

If $n$ were 1.65, then for $r'=38°$ the exit loss is about .068 and the entrance loss at $i=49½°$ is about .079 i. e. a total of about .142 or 2.9% above the 11.6% at the center. For $r'=53°$ the corresponding $i$ is about 61° and the total excess loss is 9.8%. For $r'=60½°$ $i$ is 65¼° and the total excess is 17.8%.

These values range from being the same as, to twice as large as the error factor due to zenith angle as plotted at 14 in Fig. 4. They are in the opposite sense. The unmodified zenith angle flux curves as determined by comparing $\delta z$ with $\delta y$ values therefore give a truer picture of the light flux conditions than would curves corrected by application of the error curve 14 of Fig. 4. For this reason such correction has not been made, but all the curves of Figures 2, 3 and 5 are plotted as the ratio of $\delta z$ at the center divided by $\delta z$ at the other given values of $z$ as determined for equal increments in $y$. Up to 40° this method thus gives an approximately correct answer and even at 50° is only about 3, 4 or 5% low. For maximum zenith or viewing angles appreciably above 60°, reflection losses become more exaggerated and need to be taken carefully into consideration in any determination of a suitable solution, should one exist.

The general problem and the nature of my solution will be better understood by reference to Fig. 5 in which the values of the above $\delta z$ ratios for ellipsoids of indices 1.45 and 1.65 each and some additional ones and for reciprocal eccentricities between 1.04 and 1.4 are plotted. The abscissae are zenith angles or semiangular view angles in degrees and the ordinates are light flux ratios reading from 0.30 to 1.60, where 1 is the light flux at the center or zero angle.

The individual curves or plots are numbered 1.4–1.45, 1.4–1.65, etc. to 1.04–1.45, 1.04–1.65 and 1.04–1.75 and 1.85 and represent respectively values for ellipsoids of reciprocal eccentricity corresponding to the first figure of the hyphenated number and to index that of the second figure thereof. In addition there are plotted values for three parabolas, numbered, because 1.0 is the eccentricity of the parabola, 1.0–1.45, 1.0–1.55 and 1.0–1.65, respectively where the latter half of the hyphenated number is again the index.

It will be seen from an inspection of the curves of Fig. 5 that for the parabolas represented by the curves 1.0–1.45, 1.0–1.55 and 1.0–1.65 there is a very rapid rise in light flux with zenith angle, reaching at 30° 126% for the paraboloid of index 1.65, 139% for the paraboloid of index 1.55 and 163% for the paraboloid of index 1.45. Even the high index paraboloid reaches the 163% flux value at 47° and all rise precipitously in flux value with increasing angle.

On the other hand the ellipse standing very near to the parabola in eccentricity, say that of reciprocal eccentricity 1.04, although also showing very precipitous rise in the flux curve up to nearly 50° zenith angle, especially with low index, thereafter shows a considerable drop and falls almost perpendicularly after crossing the 100% level in the region between 60° and 70°. Except perhaps where very high marginal values, i. e. in the 30° to 60° range are permissible, the use of such curves, with the low index, would not give suitable uniform light flux distribution. With the higher index, however, as shown at 1.04–1.75, the resultant flux is much more uniform and extends so up to over 60°. It, or a curve lying between it and one of somewhat greater reciprocal eccentricity, say at $1/e = 1.06$, could readily be deformed very slightly during polishing so as to flatten the apex and thus shift some of the hump in the curve toward the center so as to flatten it. The curve 1.04–1.85, even without deformation, is fairly level up to almost 60°. In a practical solution illustrated in Fig. 10 uniform high angle light flux is obtained by use of an ellipse of low reciprocal eccentricity, 1.08, and moderately high index, 1.65.

Increase in the reciprocal eccentricity from 1.04 to 1.08 lowers the maximum flux values for given index markedly. Thus for index 1.65, it is only slightly higher than for 1.04–1.85, being at 30° 8% above the central flux. The maximum angle for reasonably uniform flux for either holds up to over 50°. The 1.08–1.65 curve crosses the 100% line at about 15° smaller angle than the curve for the equivalent 1.04 ellipse. To avoid confusion the flux curves for index 1.55 are omitted for the ellipse flux values plotted in Fig. 5.

Naturally the amount of allowable variation in light flux with angle will depend upon the purposes to which the device may be put. Conceivably in some fields of application the advantage of large utilizable angle together with the ease, to be discussed later, of constructing an ellipsoidal surface, and the very slight correctional deformation easily introduced in polishing may make the ellipse of reciprocal eccentricity 1.08 or even 1.04 and of certain indexes, or ellipses lying between these in eccentricity, a very suitable choice. Interpolation in these, or the ranges presently to be described, can of course be made in order to meet the precise requirements of the particular problem. It is not considered necessary here to interpolate or add other curves as the method of deriving them has been shown.

For more nearly flat light flux characteristics the ellipses of reciprocal eccentricity 1.1 or 1.12 or thereabouts offer for some purposes a more promising solution. However with diminishing eccentricity (increasing reciprocal eccentricity) the maximum angle is diminished, beyond which there is a precipitous falling off in light flux. Thus for $1/e = 1.1$ this occurs in the 40° to 50° range and for $1/e = 1.12$ it occurs at about 10° less, for large index holding up nevertheless well into the 40°–50° range if values of a few per cent under 100% are tolerated.

With these eccentricities for which the light flux distribution up to fairly large angles is above 100%, but only at the most a few per cent above, there is, as has been seen in Figures 2 and 3 where these flux curves are plotted to larger scale, very little difference with change in index in maximum deviation from the desired uniform 100% distribution. The smaller index results principally in a smaller maximum angle, the crossing of the 100% line and subsequent decline at increasingly precipitous slopes occurring at from 5° to 10° smaller zenith angles for index 1.45 than for index 1.65. This is not true as the reciprocal eccentricity increases. Then the index for a given eccentricity, affects to an appreciable extent both the deviation of marginal flux from central flux and the maximum angle for a given fall in flux, falling much faster with smaller index.

In Fig. 5, after reciprocal eccentricity 1.12, I have next plotted flux values for reciprocal eccentricity 1.2, namely, the curves 1.2–1.45 and 1.2–1.65. Here, as stated, the index begins to make considerable difference again, the 1.45 values being quite a little lower throughout and all under 100%. At 23° they are 90% for index 1.45 and the same at 32° for index 1.65. They fall off about 1% per degree for larger angles, and somewhat faster as 20% and 30% or more loss is reached.

The flux curves 1.3–1.45 and 1.3–1.65 show respectively steeper flux losses, 1.3–1.45 falling below 90% at 17°. The flux curve 1.4–1.45 falls below 90% at 14° and below 80% after 20°. Increasing the index to 1.65 raises these angles respectively to 20° and 29°. Larger reciprocal eccentricities, approaching those of possible indices for solid transparent refracting materials, give even greater and steeper losses with increasing zenith angle.

I have thus discovered that an ellipsoid of revolution obtained by rotating an ellipse of reciprocal eccentricity $$\frac{1}{e}$$

equal to approximately 1.1, about its major axis and being cut off by a plane surface perpendicular to said axis refracts light incident on the ellipsoidal surface parallel to its major axis so as to give substantially uniform light flux distribution through a considerable solid angle of the refracted beam. As disclosed in the plots and in the above description thereof, slightly decreasing $$\frac{1}{e}$$

say to 1.08, for certain indices, only slightly increases the light flux but extends the angle appreciably. Correspondingly increasing $$\frac{1}{e}$$

in like fashion to 1.12 results in a slight decrease in flux and angles. Even more deviation than this of $1/e$ from the value 1.10 still makes quite acceptable light flux distribution, as up to a certain amount, deviation from 100% might not be detectable under conditions of use of the device.

Such values of $1/e$ are markedly different from the value $$\frac{1}{e}$$

equal to $n$, as previously employed.

By way of comparison, the eccentricity of the parabola is 1 and the increased light flux with zenith angle is relatively large and continually increasing with zenith angle. For the hyperbola, $e$ and $n=1.65$ it is still very much greater. In other words curves having the form approximately that of a conic section of eccentricity slightly less than unity, are preferable for my purpose. Eccentricity $e=1$ gives in general too large values, and eccentricity $e=1/1.2$ gives in general smaller values than are desirable, although much better than when $e$ is equal to $1/n$. Eccentricity $$e = \frac{1}{1.08} \text{ to } e = \frac{1}{1.12}$$

gives light flux uniformity for quite a large zenith angle range, the best selection depending on the limiting angles it is desired to encompass, and values somewhat outside this possibly being very suitable under circumstances and/or modifications as described.

I thus have as the most suitable form for the refracting surface giving uniform light flux for a large range of zenith angles the one which approximates an ellipse for which there is, relatively independent of the index $n$, a rather narrow choice of suitable reciprocal eccentricities, the best in the neighborhood of 1.06, 1.08, 1.10 or 1.12. Values as low as 1.04, and depending much more on $n$ for result, give an appreciable excess marginal flux, particularly for small indices, over a large range of zenith angles but, as may be important, extend the maximum useful angle markedly, whereas reciprocal eccentricities values as high as 1.20 give an appreciable diminution in marginal flux at all zenith angles, rapidly falling below 90% at zenith angles in the range 23° to 32°, depending on index. Low values of $1/e$ give only moderate excess marginal flux, but a large range of zenith angles, provided $n$ is large, viz. the curves 1.04–1.75 and 1.04–1.85.

For certain uses, as for instance in railway signal work, where the viewing angle may be limited to such small zenith angles as 10° or 15°, any of the ellipses described and plotted in Fig. 5 may give sufficiently uniform light flux distribution. However the parabola is about the upper limit for a maximum of 10% variation and the ellipse of reciprocal eccentricity 1.4 produces enough light flux drop to make a perceptible marginal dimming of the transmitted and refracted light.

In making the above solution I have abandoned the requirement that all the refracted rays come to a focus or exit from the same point on the plane surface of the truncated ellipsoid. As will be seen from Fig. 6 this is, however, not a serious objection, indeed not an objection at all, to the use of the invention.

Fig. 6 shows at 21 a section of a portion of an ellipsoid of revolution of reciprocal numerical eccentricity equal to 1.12 and index of refraction 1.5. At 22 I show the major axis of the ellipse. At 23 I show light rays incident on the ellipse parallel to the axis 22, which after refraction at the surface 21, as the rays 43, cross the said axis in the region of the arrows 24, said crossing region lying between the center 25 of the ellipse and proximal geometrical focus 26 of the ellipse. 35 is the center of curvature of the vertex of the ellipse and 36 the optical focus.

The ray 27, the most marginal of the rays 23, after refraction, crosses the axis 22 at an angle with it of 19.75°, and after refraction again at a plane surface (not shown) placed perpendicular to the axis 22, thus separating from air the medium of index 1.5 enveloped by the ellipse, it would exit and make an angle with the axis 22 of 30.45°, the zenith angle above referred to. As compared with an axial pencil, the light flux along this pencil is 101%, i. e. 1% more light. In the example, along none other of the rays up to 33° zenith angle is there more light flux deviation than about 2% when compared with the center. A very slight increase in the reciprocal eccentricity would make the difference, at 30°, zero. A slight decrease would increase the flux and might be more indicated than a decrease, because as has been shown, it increases at the same time the maximum zenith angle for 100% flux. Reference may be had to Fig. 1 for the geometrical diagram of refraction at the plane exit surface. In that figure as already described 4 is the plane surface and 5 is a refracted exit ray making a zenith angle $z$ or 6 with the axis 2. As has been shown, changes in eccentricity or index, within the limits of the invention as discussed, can be made to bring about adjustments in flux distribution to suit the requirements for maximum zenith angle and allowable deviation from absolutely uniform flux.

All of the rays 23, after refraction at the surface of the ellipse, as the rays 43, do not come to a focus but do pass through an opening symmetrically placed with respect to the axis, whose position and smallest relative size is indicated by the two opposed arrows 24. The opening 24 is situated further from the vertex than is the optical focus 36. The ratio of the radius of this opening to that at the entrance pupil at the ellipsoid surface as defined by the distance of the marginal ray 27 from the axis 22, or by the opening included between the arrows 28 and 28', is approximately as 1 to 20. In other words, an ellipsoid formed by revolution of the ellipse 21 about its major axis 22 could be made the one boundary surface of a transparent refracting material of index, in this case 1.5 but in the general case of any suitable index, and the other boundary could be a plane perpendicular to the axis 22 at the position of the stop 24. It would then be found that the area of the exit surface in the region of the stop 24 which must be left clear in order to pass all the light incident on the ellipsoid parallel to its major axis up to an entrance pupil area corresponding to a semi angle of view or zenith angle, on the plane surface side, of over 30° is only $1/400$ of said entrance pupil area. That is only $1/400$ of the viewing side of the screen element need be left transparent. In a screen composed of a close assembly of such elements only $1/400$ of the total area on the viewing or exit side need be left transparent. The balance of the surface could be painted black without interfering with the luminosity of the screen image projected through from its other face.

This result is accomplished by means, as I have discovered, which give substantially uniform light flux up to very large viewing angles with the vertical to the screen surface.

In contradistinction to the ellipse of large reciprocal eccentricity employed by Jensen, the light rays 43 in my ellipse, rays which are continuations, after refraction at the ellipse, of rays incident thereon parallel to the major axis, cut the major axis of the ellipse between the proximal focus 26 and the center 25 of the ellipse and not beyond the center at the distal focus.

It is perhaps not practical to always have the light from the projector or other light source incident on the screen parallel to the axis of each ellipse on which it falls. The ellipses forming the lenticules comprising the screen are presumably all assembled with their major axes parallel and perpendicular to the plane of the screen, although, as will be discussed later, they need not be. If the projector is not at infinity, or if the incident light is not collimated, the light incident at the margin of the screen may then make an appreciable angle with the normal to the screen. The following exemplifies the resulting situation.

In Fig. 6 I show, in addition to the group of rays 23 incident parallel to the axis 22, a group of rays 31 incident at 5.5° lesser angles to the ellipse than the rays 23. At 33 I show a group of rays making 5.5° greater angles to the ellipse than the rays 23. To avoid confusion the rays 31, both before refraction, and after refraction as the rays 41, are indicated by dotted lines. For the same reason the rays 33, and their continuation after refraction as the rays 42, are indicated by dash lines. The refracted rays 41, 42, for the most part still cut the axis 22 of the ellipse between its center 25 and its proximal focus 26. In any case a stop represented by the opposed arrows 29 placed approximately as before, that is close to the arrows 24, to the left of the optical focus 36, and between the center 25 and the proximal geometrical focus 26, provides a small opening symmetrically placed with respect to the axis 22 through which all the rays pass. For this incidence angle the rays 42, that is those from one half of the ellipse only, come to an approximate focus at 39. In most configurations no such focus exists. Said stop 29 could also be chosen as the locus of the stop 24 passing the axially directed rays 23 which after refraction become the rays 43. As in the former case, so here, the position of the plane exit surface at 29 bounding the ellipsoid on the viewing side can still have an area which is relatively small, in this case only approximately 1/20 that of the entrance pupil on the other or elliptical face of the screen element. This is still below the threshold at which the exit surface of an assembly of such elements can serve to appreciably reflect stray light.

The light flux along the exit rays corresponding to the rays 41 and 42 after they have been refracted at a normal plane surface, is likewise quite constant, thus maintaining even when light is not incident normal on the screen, the uniform flux distribution which is an advantage of my invention.

In the following Table II, I give for an ellipsoid of reciprocal eccentricity 1.12 and index 1.5 the exit angles or zenith angles and light flux at such angles for rays making an angle of plus 5°.5 and minus 5°.5 with the axis of the ellipsoid, said rays in each instance meeting the ellipsoidal surface in the same points as the rays corresponding to the lines 2 to 7 inclusive of columns 1 and 2 of Table I.

*Table II*

| Exit angle z for +5.5° | .12° | 3°.51 | 10°.23 | 16°.81 | 23°.18 | 26°.29 |
|---|---|---|---|---|---|---|
| Light flux_percent | 97.9 | 97.6 | 97 | 96.6 | 95.42 | 94.57 |
| Exit angle z for −5.5° | 11°.04 | 14°.29 | 20°.61 | 26°.63 | 32°.37 | 35°.14 |
| Light flux_percent | 100.98 | 102. | 104.7 | 106.2 | 107.2 | 103.1 |

The percent flux values along the rays after exit from the plane surface of the truncated ellipsoid are in each instance with reference to 100% flux for an axial ray.

The rays corresponding to the minus angle and larger exit angles may be of less practical importance as they represent, for a centrally placed projector, divergent rays tending to fall outside the field of view in front of the screen, that is toward the edge thereof. Those corresponding to the plus angle represent viewing angles when looking toward the edge of the screen from a point of view in front of the center or from in front of the opposite edge of the screen.

Since the large minus incidence angles may mostly represent nonutilized light they may perhaps best be ignored in adjusting the range of light flux deviations to a minimum. By way of example, one might for instance find it advisable to decrease the reciprocal eccentricity of the ellipsoid to 1.1 or slightly less so as to increase the light flux percentages throughout. Or a change in index, or both, might be made.

The view angles given in Table II need not be considered as representing maximum view angles nor as representing the most satisfactory flux values obtainable according to the invention. By applying the principles herein set forth changes may be made which adjust these flux values up or down and change their relative amounts in the manner set forth for rays parallel to the axis. Also extension to greater view angles can be made as described.

These data and the underlying considerations thus show that considerable uniformity of flux can be attained over a wide range of angles, both as to incidence and reflection, using an ellipsoidal surface according to the invention.

It should be clear from the preceding descriptions and discussion concerning the building up a screen according to the invention so that light incident more or less normal on the one surface is transmitted and refracted so as to exit from the opposite surface through a relatively small area and be fanned out with comparatively even flux distribution throughout a predetermined solid angle that the size of the individual screen element or lenticule having this property will depend upon, or may be determined by, the requirements for discrete separation and registration of unit area portions of the frontal section of the incident beam and also by the requirements for making the discrete exit areas closely enough spaced to either appear to coalesce or in the manner of an ordinary line screen image sufficiently delineate the image thrown on the screen. In any case the size should be so chosen as to suitably space the exit areas for the purpose intended. The size of the lenticule need not affect its form or the shape of its curved surface or the limits of the viewing angle. The latter are determined, as I shall show, by its shape in contradistinction to its size.

For the sake of clarity in the interpretation of the invention and of the figures embodying the same I include in Fig. 7 a rendering of an assembly of lenticules or coplanar refracting elements (here two only) such as might each represent a piece of transparent refracting material carrying on one face an ellipsoidal surface 51 corresponding to that portion of the ellipsoidal surface 21 of Fig. 6 which lies between the arrows 28 and 28', and carrying as the opposite face the small plane exit surface 52 corresponding to the exit aperture included between the arrows 29, or 24, of Fig. 6. 55 is a supporting structure, which might be metal, and 56 represents opaque material forming a screen surface of which 52 constitute the apertures. This surface 56 is placed further from the ellipsoidal surface 51 than is the optical focus 57 for proximal rays falling on the same. In Fig. 1 the ellipse 1 corresponds to 51 and the plane surface 4 to 52. In Fig. 7 rays incident on the ellipsoidal surface 51 traverse the interior of the lenticule in the same manner as shown in section in Fig. 6 by the rays 41, 42 and 43, and at the surface 52 they are refracted to exit at increased axial inclination in the manner of the ray 5 of Fig. 1. It is along exit rays such as 5 that I have attained a uniform light flux for uniform incident light flux.

As has been disclosed, the extent of solid angle embraced in the exit light cone is determined by the extent of the elliptical section used, that is, as in Fig. 6 by the position of the limiting arrow 28 to which corresponds as in Fig. 1, a marginal ray exiting as at 5. Where the size of the lenticule, that is the portion of the screen area which it shall occupy, has been determined on the basis of other consideration as discussed, then, since the extent of the ellipse used is determined by the maximum view angle or zenith angle required, the amount of magnification (or reduction) in the absolute dimensions of the ellipse will be that necessary to bring this used portion to size. That is, after selection of the position of the arrows 28 and 28' and while keeping the form of the ellipse, the amount of space included between the two arrows 28 and 28' may be made as desired by change of scale without changing the position of the arrows with respect to the ellipse. This change of scale however changes the absolute distance from the surface 51 to the surface 52, Fig. 7, this distance being related to the ellipse form and its index and to the best position for the stop or exit surface as influenced by incidence angles and ray paths as discussed above.

The selection of the location of the arrows 28 and 28' with respect to the ellipse, that is the delimiting of the area of the ellipse utilized serves as a means of limiting the viewing angle of the transmitted and refracted ray. The possibility of using this delimitation of the ellipsoidal surface as a means of limiting the spread of the light on the viewing side constitutes an important feature of my invention.

Thus, by way of example, in railway signal work it may be desired to limit the maximum viewing angle of a signal light to 5° in the vertical meridian and to 30° in the horizontal meridian, zenith angles 2½° and 15° respectively. This can be accomplished, as I have discovered, by giving a rectangular form to the incidence surface of the lenticule so that for instance, by reference to Table I, in the horizontal meridian the ray exiting at 15° and corresponding to the incident ray R23 of Fig. 6 is a marginal ray, and in the vertical meridian a ray incident as in Fig. 6 at a point something less than half way between the axis and the first depicted ray 23, is a marginal ray.

In Fig. 8 I show an arrangement of lenticules 61 of such rectangular form. For a signal light as described a disk of this pattern and surface form would be placed in the lamp house cover frame and receive on said surface a collimated beam of light. The disk could be of appropriate color glass. Each lenticule 61 would have a cross section such as to permit of light paths as in Figs. 1 and 6 and have a substantially plane exit surface of small dimension as indicated in plane view at 62. Thus in Figs. 7 and 8, 61 and 51 correspond and 62 and 52 correspond.

In Fig. 8 the arrangement of the lenticules need not of course be staggered nor need they be strictly rectangular. Other arrangements may have advantages and be preferred. The arrangement shown gives an even spacing of the exit pupils 62 but makes for sharp breaks in surface continuity on the opposite face at the joints, which could be obviated by not staggering the lenticules.

Another advantage of this delimiting feature of the invention is that all of the light in the collimated incident beam (exception taken of the reflection and joint losses) is confined to the chosen exit light cone and hence is much more intense in said cone than where delimitation of light transmitted through and spread by diffusing screens is had by the use of baffles and other limiting devices.

Similarly in motion picture work and theater screens, the limiting of the incident light to refraction within given view angles increases the intensity within said angles in proportion as said angles are small. It also constitutes a superiority of said screens over diffusing screens whose limits of diffusion are not sharp and hence which waste light as well as give uneven intensity distribution.

Discussion has been given to the problem of incidence oblique to the axis of the ellipse and its effect on viewing or zenith angles. In the normal, or symmetrical, lenticule construction this resulted in small zenith angles to the side on which they might better have been big. However, as will be seen readily from a reconsideration of the underlying theory and of the data graphed in Fig. 6, and by virtue of the zenith angle delimitation phenomenon above described, it is possible to extend the zenith angle as much as desired, and even on one side only, by increasing the length of the limb of the ellipse opposite to the said side, that is by moving in Fig. 6 the arrow 28, lying opposite arrow 28', further from the axial point of the vertex of the ellipse, say to the position 30. Two lenticules as thus modified are shown in Fig. 9 side by side in perspective as if in position on a screen. At 71 I show the ellipsoidal face of a lenticule which might be located, for instance, near the border of a screen. The limb 73, corresponding to the arrow 30 of Figs. 6 and 9, and which limb is the one furthest from the center of the screen, is the longest. That is the axis 74 of the ellipse, here normal to the plane 75 of the screen, is shifted away from the side of the lenticule corresponding to the limb 73. Because of the oblique path and displacement with respect to the axis of the obliquely incident rays before and after refraction at the ellipse surface, as shown at 33, and 42 in Fig. 6, and the presumed absence of rays incident normally, or obliquely from the other direction, for instance, corresponding to the rays 41 and 43 of Fig. 6, the stop 29 of Fig. 6 may be shifted off the axis as shown at 72, Fig. 9, thus also permitting the stop to be reduced in size. The position of the surface 72 is shifted slightly further from the vertex of the ellipse than is the stop 29 of Fig. 6, this because of the new rays resulting from the increase in aperture from the position 28 to the position 30. The surfaces 58 limiting the apertures 72 may be opaque, or an opaque surface may be supplied as at 56, so as to constitute with 72 an opaque apertured screen.

At 76 I show rays incident obliquely at an arbitrary angle of 5°.5, as if coming from a centrally placed projector towards the edge of a screen. At 77 I show a marginal ray, which if meeting the ellipse at the point marked by the arrow 28', exits at the surface 72 as the ray 78. Its exit angle, or zenith angle, is 35°.1. If the angle of this outwardly directed ray is more than is required, as below discussed, it could be reduced by shortening the limb of the ellipse in the sense of moving the arrow 28' nearer to the vertex thereof. At 79 I show one of the rays 76 incident at the edge of the limb 73 of the ellipse, meeting it at the point marked by the arrow 30, the angle of incidence being, for the example, 68°.9. At 80 I show the corresponding inwardly directed exit ray, whose zenith angle is 39°.3. Both the ellipse 71 and the delimiting arrows are drawn to scale and correspond with the data of Fig. 6 for an ellipse of reciprocal eccentricity 1.12 and index 1.50. The rays 76 are the rays 33 of Fig. 6.

Although not so drawn, it may also be desirable to reduce the length of the limb marked in Figs. 6 and 9 by the arrow 28' so as to eliminate useless marginal rays arising therefrom: that is, to eliminate the rays 78, directed upwards in the figure, or away from the center of the screen. It may be remarked, parenthetically, that in Fig. 6 rays incident on the opposite limb of the ellipse parallel to the rays 33 will bunch up at 42 with the rays 42, for they will be symmetrical, with respect to the axis 22, to the rays 41. Nevertheless it is obvious from Fig. 6 that the ray 78, corresponding to the ray 77, of Fig. 9 (or corresponding to the marginal ray 31 of Fig. 6) will exit near the axis, indicating an appreciable dispersion of the exit rays over the area of the aperture.

In this example, Fig. 9, the light flux values for a series of rays or stations across the surface of the ellipse 71, extending from the margin 28' to the margin 30 may in large part be read from Table II. They are 106.1%; 107.1%; 106.2%; 104.7%; 102.0%; 101.0%; 97.9%; 97.6%; 97.0%; 96.6%; 95.4%; 94.6%; and, finally, 84.1% along the ray 80.

An increase in the zenith angle of the ray 80 by simple extension of the limb 73 would result in still greater light flux loss, both due to the geometrical relationships and because of the increase in the reflection loss as the incidence angle, now 68°.9, is increased. Change in the ellipsoid, for instance, by increasing its index, would improve this.

In Fig. 10 I show a means of markedly increasing the obliquity of incidence of light on the screen, wherein the inwardly directed zenith angle is large and wherein there is also flattening of the light flux distribution to make it more uniform. This is done by tipping the axis of the ellipse or lenticule toward the incident light. The asymmetry of the utilized figure is further increased, over that of Fig. 9, in order to discard outwardly directed rays at too large zenith angles. The choice of the ellipse of Fig. 10, and of its index, are such as to increase the maximum zenith angle without an increase in the maximum incidence angle. The maximum zenith angle and incidence angle are more nearly equal than they are in Fig. 9.

In Fig. 10, 83 is the long limb of the ellipse 81. In this particular example the other limb is absent altogether, the axis, 84, of the ellipse being at the margin of the lenticule in one face of its hexagonal section. The axis, 84, of the ellipse is oblique to the plane 85 of the screen support in such direction as to be parallel, or nearly parallel, with the incident light, that is so that the apex of the ellipse is tipped toward the center of the screen of which the lenticule is a member. The axis, 84, in this example, makes an angle of 20° with the normal to the plane 85 of the screen support. 82 is the plane exit surface and stop or screen aperture normal to the axis of the ellipse.

As before, and in order to still further increase the possible obliquity of the incident light, the light rays 86 are made incident on the ellipse 81 at an arbitrary angle of 5°.5 with its axis. The total angle with the normal to the screen is in this example thus 25°.5.

In order to arrive, in this figure, at a reasonably uniform light flux distribution for the exit rays I have chosen as an example from among the flux curves of Fig. 5 an ellipse of index 1.65 and reciprocal eccentricity 1.08.

A marginal ray 89, of the group 86, is incident on the limb 83 of the ellipse with an angle of 68°.9 and exits from the surface, 82, as the ray 90 with a zenith angle of 53°, that is, 33° with the normal to the screen. Light flux along this ray is 93.4%. If the ray 89 had been parallel with the axis the exit or zenith angle would have been 57° (incidence angle 63°.4) and the light flux 95.2%.

The ray 87, incident at the vertex of the ellipse at an angle of 5°.5, exits as the ray 88 at the same zenith angle, light flux 99.3%. The angle of the ray 88 with the normal to the screen is 25.5°.

In the example the light flux values for a series of rays or stations across the surface of the ellipse 81 corresponding to $y$ values of 0; 0.052; 0.129; 0.200 and 0.227 for the ray 86 are respectively 99.3%; 99.5%; 104.4%; 101.2% and 93.4%. This is, by comparison with the previous example, a good result, dependent in part on the form of the ellipse, and in part on its index. The exit rays for the stations 0.129 and 0.200 are shown at 96 and 97, thus indicating the dispersion of the exit rays over the area of the exit aperture. The surfaces 95 might be opaque, or other opaque material might be positioned as at 56, Fig. 7, so as to form an opaque apertured screen at the plane of the surfaces 82.

In Fig. 9 the proximal geometrical focus of the ellipse 71 is at 91 and its center is at 92. The optical focus for proximal rays is at 59, spaced a considerable distance from the aperture 72. In Fig. 10 the proximal focus of the ellipse 81 is at 93 and the vertex, on the scale of the above designated values of $y$ is at $x=1.0$. The center is off the limits of the drawing but the minor axis of the ellipse, when extended, passes through the point 94 up in Fig. 9. 98 is the center of curvature of the vertex and 99 is the optical focus of paraxial rays, also quite distant from the aperture 82.

The ellipses of these two figures are thus executed to markedly different scales, although their utilized portions are or may be of substantially the same dimensions. The scales for the two screens, 75 and 85, are not exactly the same, though the difference is slight and accidental. If both were parts of one screen, convenience would seem to demand their being to the same scale as they readily could be. The lenticule design of Fig. 10 would be placed further toward the border of the screen than that of Fig. 9, the reverse of the order in the drawings.

As previously stated, the actual scale or dimensions of the lenticule will depend on the requirements as to spacing of the exit cones 52, or 72, or 82. For a 20-foot motion picture screen I have executed lenticules 3/16 inch in diameter or spacing. For a smaller screen smaller lenlenticules might be required. For an 8 inch railway signal light lenticules 0.1" x 0.6" might be suitable.

The exposition giving the relationship between $y$ and $z$, as developed earlier in the specification, presupposed an ellipsoidal surface symmetrical with respect to the axis of the ellipse. However, an ellipse having suitable properties for light flux purposes as thus determined, will likewise have the same properties as related to zenith angle, throughout a viewing cone asymmetrically limited with respect to the axis of the ellipsoid of revolution. It should nevertheless be recognized that the particular hexagonal form given to the lenticules in the Figures 9 and 10 may not be the most suitable one for its effect on limitation of viewing angle in other meridians than the one particularly considered. I do not limit myself to the employment of viewing cone configuration conforming to the boundaries of the ellipsoidal surfaces as depicted.

The limits of the viewing cone, as a solid angle, determine the absolute density of the light along any ray of the cone. The smaller the cone, the greater the light flux. The application of this principle, through limitation of the boundary of the ellipsoidal surface, permits of increasing the light flux at the margin of the screen so as to compensate for decreased illumination at the margin, particularly occurring with wide angle short projection. It is believed that such increase or compensation, when together with viewing angle compensation, has not hitherto been possible.

In either Fig. 9 or 10, the degree of asymmetry or of tipping can correspond in whole or in part with the amount of obliquity of the incident beam on the screen. In a complete assembly of lenticules to form an extended screen either or both could increase regularly, or step-wise at intervals, across the screen, depending upon requirements as to performance and exigencies of construction. For instance, I have shown how a gradual progression to 5° or more obliquity of incidence of the light is substantially without effect on performance. At this point, or some such point, a step-wise or abrupt correction, as to Fig. 9 or Fig. 10, could be made.

For tipped lenticules, where the axial rays may not be used, it may be best, as in Fig. 10, to decrease the reciprocal eccentricity, as compared with other lenticules of the screen, so as to take advantage of the increased zenith angles obtainable. Various combinations for the refracting surface of the lenticules in different positions on the screen will naturally present themselves as being desirable.

In the foregoing much exposition has been devoted to the properties I have discovered for certain ellipses which permit of the solution of the light flux and other problems in specular lenticule screen design. That certain ellipses can be found to satisfy the requirements of the problem is important because of the ease with which an ellipsoidal surface of revolution can be executed in materials which can be ground and polished, such for example, as die steel.

In Fig. 11, A is a free axis, B is a fixed axis, and D is an axis constrained to move in a plane containing B. P is an abrasive or polishing plate rotating on an axis X so that P lies in a plane passing through B and perpendicular to the plane containing B and D. E is an axis perpendicular to and passing through D and A and supporting a material on which an ellipsoidal surface S is to be formed. The intersection of E with D is the focus F of the ellipse. As the arm AB is oscillated about B the surface P envelops an ellipsoidal surface S for which, in the notation used above, $$AB = a$$
$$AD = \sqrt{a^2 - b^2}$$

and $$e = \frac{AD}{AB}$$

After an ellipsoidal die or element has been once formed on a machine operating on this principle, it can readily be given certain slight modifications as discussed above. In fact, it requires skill to bring a surface exactly to the theoretical form without over grinding or polishing. Verification of correct form can be made by orthoscopic enlargement of a meridianal section and super-position on a carefully drawn large scale ellipse.

The foregoing particulars and embodiments described are illustrative merely and not intended as defining the limits of the invention. Nor are its applications limited to the few examples and fields mentioned. As to the latter, the advertising sign field constitutes, for instance, another important use for the invention.

I claim:

1. An assembly of refracting elements positioned side by side and substantially in a common plane, each with two limiting optical surfaces one of which is an ellipsoid formed by the revolution of an ellipse about its major axis and the other is a plane surface normal to the major axis of the ellipse, in which the index of refraction of the elements is at least 20% greater than their reciprocal eccentricity.

2. An assembly of coplanar refracting elements each with two limiting optical surfaces one of which is a portion adjacent to the vertex of an ellipsoid formed by the revolution of an ellipse about its major axis and the other is a plane surface normal to the said axis and intersecting it at a point between the center of the ellipse and its geometrical focus proximal to said vertex in which the index of refraction of the elements is at least 20% greater than their reciprocal eccentricity.

3. An assembly of refracting elements as in claim 1 in which the reciprocal eccentricity of the ellipse is between 1.14 and 1.10.

4. An assembly of refracting elements as in claim 1 in which the reciprocal eccentricity of the ellipse is 1.12.

5. An assembly of refracting elements as in claim 1 in which the reciprocal eccentricity of the ellipse is less than 1.10.

6. An assembly of refracting elements as in claim 1 in which the reciprocal eccentricity of the ellipse is between 1.10 and 1.04.

7. An assembly of refracting elements as in claim 1 in which the reciprocal eccentricity of the ellipse is approximately 1.08, and the index of refraction of the element is approximately 1.65.

8. An assembly of refracting elements each with two limiting optical surfaces one of which is a portion adjacent to the vertex of an ellipsoid, having an index of refraction at least 20% greater than the reciprocal eccentricity of an ellipse by whose revolution about its major axis said surface is formed, and the other surface of which is a plane normal to the said axis and intersecting it at a point lying between the center of the ellipse and the geometrical focus proximal to said vertex, in which the elements are all positioned side by side in a common plane with all the ellipsoidal axes normal to the said plane.

9. An assembly of refracting elements each with two limiting optical surfaces one of which is a portion of an ellipsoid formed by revolution of an ellipse having a reciprocal eccentricity less than 1.10, about its major axis and the other is a plane surface normal to the said axis, the elements having an index of refraction at least 10% greater than the reciprocal eccentricity of said ellipse, in which the elements are all positioned side by side in a common plane with all the ellipsoidal axes normal to the said plane and in which the extent of the ellipsoidal surface is differently limited in different meridians having the said axis as a pole, thereby to correspondingly differently limit the solid angle distribution on the plane surface side of a collimated beam incident more or less normal to the plane of the assembly on the ellipsoidal surface side of the element.

10. An assembly of refracting elements positioned side by side substantially in a common plane, each with two limiting optical surfaces, one of which is a portion of an ellipsoid formed by revolution of an ellipse about its major axis and the other is a plane surface normal to the said axis, the elements having an index of refraction at least 10% greater than the reciprocal eccentricity of said ellipse, in which certain of said elements, those positioned at some distance from the axis of the screen, are tipped to have their axes form an oblique angle with said plane, thereby to decrease the angle between an incident beam of light and said axes, substantially as described.

11. An assembly of coplanar refracting elements as in claim 21, in which certain elements have their ellipsoidal surfaces delimited asymmetrically with respect to their axes, thereby to delimit in a predetermined manner the solid angle distribution on the plane surface side of light incident more or less parallel to the said axes on the ellipsoidal surface side.

12. An assembly of refracting elements as in claim 10 in which the said tipped elements have their ellipsoidal surfaces asymmetrically delimited with respect to their said axes, thereby to delimit in a predetermined manner the solid angle distribution on the plane surface side of light incident more or less parallel to the said axes on the ellipsoidal side.

13. An assembly of refracting elements as in claim 10 in which the said tipped elements have their ellipsoidal surfaces asymmetrically delimited with respect to their said axes, thereby to delimit in a predetermined manner on the plane surface side the solid angle distribution of light incident more or less parallel to the said axes on the ellipsoidal side, and in which the index of refraction of the said tipped elements is greater than 1.60 and the reciprocal eccentricity of the ellipsoids bounding on one side said tipped elements is less than 1.10.

14. In an apparatus of the class described, the combination with an opaque apertured screen of means of receiving light from a source and projecting the same on the screen, said means comprising a plurality of coplanar optical devices, each with two limiting optical surfaces one of which is a portion adjacent to the vertex of an ellipsoid, formed by revolution of an ellipse about its major axis and the other is a plane surface normal to the said axis at the position of said opaque screen, in which the major axes are all normal to said opaque screen, the screen being positioned exterior to and beyond the paraxial foci of the coplanar devices and nearer to the said vortex than is the more distant of the two geometrical foci, substantially with an aperture at the area of most concentrated light flux, and in which the index of refraction of the optical devices is at least 20% greater than the reciprocal eccentricity of the ellipse.

15. In an apparatus as described in claim 14, optical devices in which the reciprocal eccentricity is less than 1.10

16. An assembly of coplanar refracting elements each with two limiting optical surfaces one of which is an ellipsoid formed by revolution of an ellipse of reciprocal eccentricity less than 1.10 about its major axis and the other a plane surface normal to said axis, the elements having an index of refraction at least 10% greater than the reciprocal eccentricity of said ellipse, in which certain elements have their ellipsoidal surfaces delimited asymmetrically with respect to their axes, thereby to delimit in a predetermined manner the solid angle distribution on the plane surface side of light incident more or less parallel to the said axes on the ellipsoidal surface side, and in which the plane surfaces of the said certain refracting elements are asymmetrically delimited with respect to the said axes.

17. A refracting element with two limiting optical surfaces one of which is a portion adjacent to the vertex of an ellipsoid formed by the revolution of an ellipse about its major axis and the other is a plane surface normal to the said axis in which the reciprocal eccentricity of the ellipse is at least 10% less than the index of refraction of the element.

18. A refracting element as in claim 17 in which the reciprocal eccentricity is not less than 1.10.

19. A refracting element as in claim 17 in which the reciprocal eccentricity is less than 1.10.

20. A refracting element as in claim 17 in which the plane surface intersects the said axis at a point short of the distal focus of the ellipse together with an apertured stop centered on the axis and located at this plane surface, substantially at the area of most concentrated light flux.

21. An assembly of refracting elements positioned side by side and substantially in a common plane, each with two limiting optical surfaces one of which is an ellipsoid formed by the revolution of an ellipse about its major axis and the other is a plane surface normal to the major axis of the ellipse in which the index of refraction of the elements is at least 10% greater than their reciprocal eccentricity.

HARRY SIDNEY NEWCOMER.